(12) United States Patent
Chen (10) Patent No.: US 12,240,348 B2
(45) Date of Patent: Mar. 4, 2025

(54) BATTERY REPLACEMENT DEVICE AND POWER SUPPLY DEVICE

(71) Applicants: Futaijing Precision Electronics (Yantai) Co., Ltd., Yantai (CN); HON HAI PRECISION INDUSTRY CO., LTD., New Taipei (TW)

(72) Inventor: Yen-Chen Chen, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 448 days.

(21) Appl. No.: 17/723,664

(22) Filed: Apr. 19, 2022

(65) Prior Publication Data
US 2023/0226943 A1 Jul. 20, 2023

(30) Foreign Application Priority Data
Jan. 20, 2022 (CN) .......................... 202210063836.0

(51) Int. Cl.
*B60L 53/80* (2019.01)

(52) U.S. Cl.
CPC .......... *B60L 53/80* (2019.02); *Y10T 29/49108* (2015.01)

(58) Field of Classification Search
CPC .......... B60L 53/80; B60L 50/66; B60L 53/35; Y10T 29/4973; Y10T 29/49108
USPC ........................... 29/623.1, 402.08, 762, 763
See application file for complete search history.

(56) References Cited

U.S. PATENT DOCUMENTS

| | | | |
|---|---|---|---|
| 5,612,606 A | 3/1997 | Guimarin | |
| 10,870,365 B2 * | 12/2020 | Ahrens | B60L 53/80 |
| 11,623,541 B2 * | 4/2023 | Zhang | B60L 53/62 |
| | | | 320/104 |

FOREIGN PATENT DOCUMENTS

| | | |
|---|---|---|
| CN | 113492716 A | 10/2021 |
| TW | 370497 B | 9/1999 |

* cited by examiner

*Primary Examiner* — Thiem D Phan
(74) *Attorney, Agent, or Firm* — ScienBiziP, P.C.

(57) ABSTRACT

A device for substituting a spent battery with a fully charged battery in AGV and AMR robots and recharging the spent battery includes a supporting assembly, a detection assembly, a driving assembly, and a locking assembly. The supporting assembly 10 carries a battery. The driving assembly drives the battery to move into a position in the supporting assembly according to signals of the detection assembly and the locking assembly, to complete automatic replacement and installation process of the fresh battery. Battery replacement and installation process can be completed automatically, work efficiency is improved, and labor intensity of staff is reduced.

17 Claims, 5 Drawing Sheets

BATTERY REPLACEMENT DEVICE AND POWER SUPPLY DEVICE

FIELD

The subject matter herein relates to technical field of mechanical automation, especially relates to a battery replacement device, a battery replacement method, and a power supply device.

BACKGROUND

With the development of logistics industry, more and more devices such as automated guided vehicle (AGV) and autonomous mobile robot (AMR) are used in unmanned transportation scene. Battery replacement is common for AGV/AMR power replacement, when a fully charged battery replaces a spent battery wherever the machine is out of power so that locating a socket to recharge is not needed. At present, the battery replacement process is basically completed manually. Because the machine body of AGV OR AMR is low and the battery weight is heavy, usually more than 10 kg, replacing the battery manually may cause difficulty and reduce work efficiency.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

Description of main components or elements:
Battery replacement device 100;
Supporting assembly 10;
Carrier plate 11;
Protrusion 111;
First through hole 112;
Second through hole 113;
Third through hole 114;
Positioning plate 12;
Connector 121;
Positioning column 122;
Mounting base 13;
Receiving groove 131;
guiding structure 14;
Roller 141;
Detection assembly 20;
First rotating member 21;
First detector 22;
Second rotating member 23;
Second detector 24;
Driving assembly 30;
Driver 31;
Gear assembly 32;
First gear 321;
Second gear 322;
Transmission shaft 323
Output shaft 33;
Drive belt 34;
Locking assembly 40;
Locking member 41;
Inclined surface 411;
Abutting surface 412;
Positioning controller 42;
Control unit 50;
Push assembly 60;
Push member 61;
Push driver 62;
Standby power supply 70;
Power supply device 200;
Battery 201.

DETAILED DESCRIPTION

In order to make the above-mentioned objects, features, and advantages of the present application more obvious, a description of specific embodiments of the present application will be described with reference to the accompanying drawings. The present application can be implemented in many ways different from those described herein, and those skilled in the art can make similar improvements without violating the contents of the present application. Therefore, the present application is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in the present application herein are only for describing specific embodiments, and are not intended to limit the present application.

Figure 1:
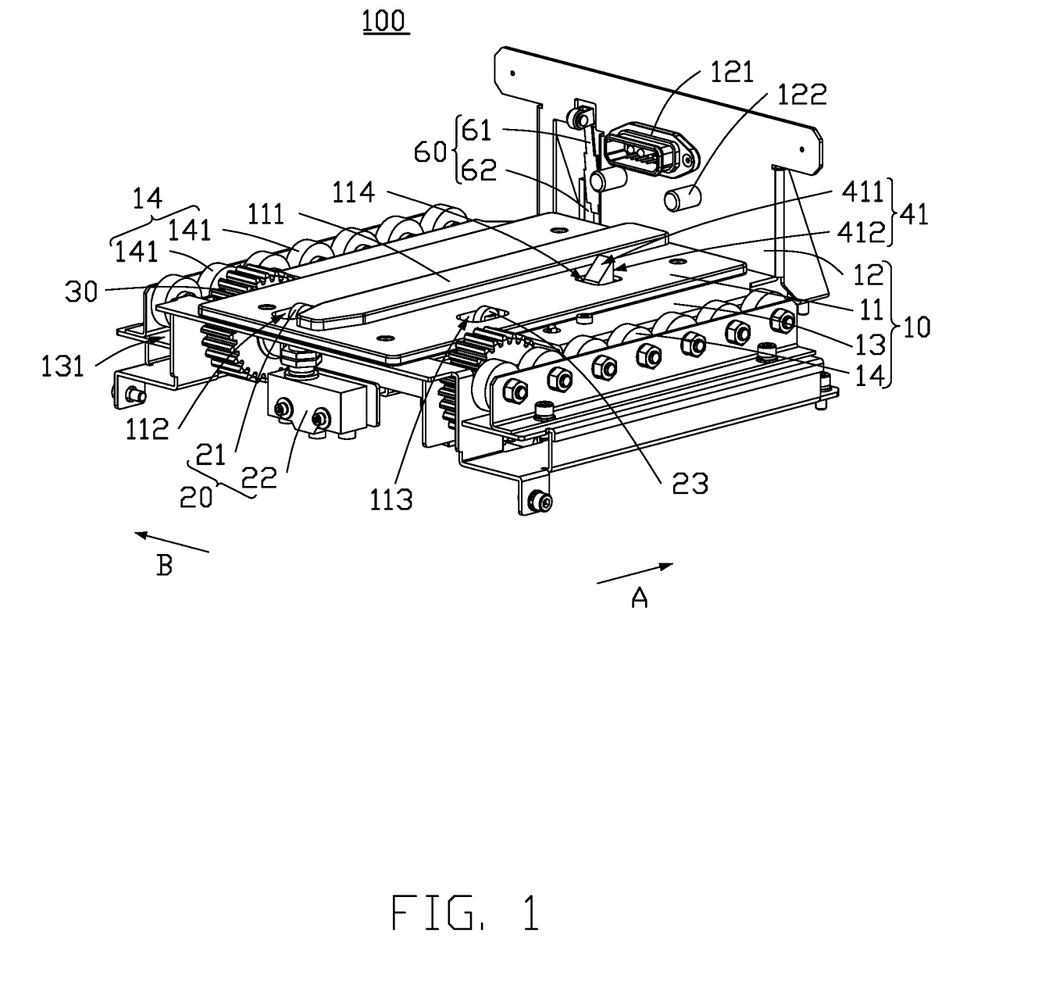
FIG. 1 is a schematic view of a battery replacement device in an embodiment according to the present disclosure.
Figure 3:
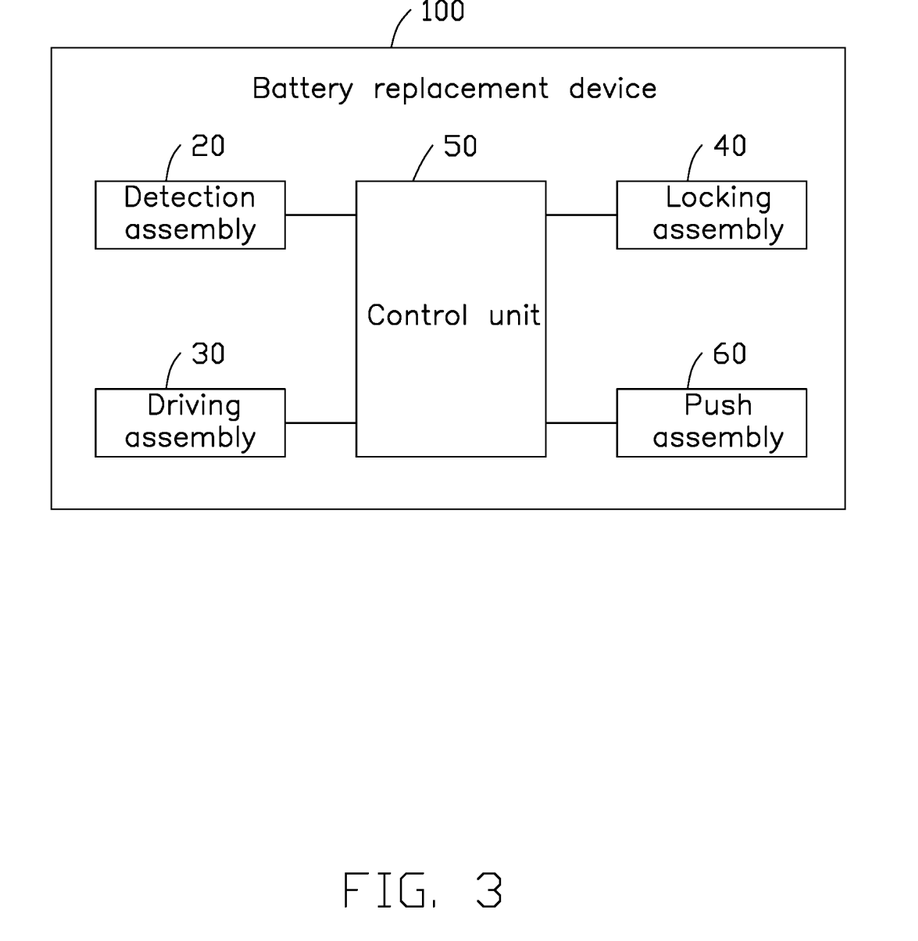
FIG. 3 is a diagram of the battery replacement device of another embodiment according to the present disclosure.

Referring to FIG. 1 and FIG. 3, an embodiment of the present disclosure discloses a battery replacement device 100, the battery replacement device 100 includes a supporting assembly 10, a detection assembly 20, a driving assembly 30, and a locking assembly 40. The supporting assembly 10 is configured to carry a battery. The driving assembly 30 is configured to move and position the battery in the supporting assembly 10 according to signals of the detection assembly 20 and the locking assembly 40, to complete automatic replacement and installation process of the fresh battery.

Specifically, the supporting assembly 10 includes a carrier plate 11 and a positioning plate 12. Along a first direction A, the positioning plate 12 is arranged on one side of the carrier plate 11. The carrier plate 11 is configured to carry the battery. A connector 121 is positioned on the positioning plate 12, and the connector 121 is configured to electrically connect the battery with a circuit board and other components.

Furthermore, a protrusion 111 is positioned on the carrier plate 11. The protrusion 111 is roughly in a long strip shape and arranged along the first direction A. A groove (not shown in figures) is defined on the battery, and the groove is corresponding to the protrusion 111. When the battery moves on the carrier plate 11, the protrusion 111 can be accommodated in the groove, so as to guide the moving of the battery, prevent erroneous placement of the battery and improve alignment accuracy between the battery and the connector 121.

In an embodiment of the present disclosure, the supporting assembly 10 further includes a mounting base 13. The carrier plate 11 is detachably positioned on the mounting base 13. The positioning plate 12 and the mounting base 13 are connected in one piece. A side of the carrier plate 11 away from the positioning plate 12 is an inlet side of the supporting assembly 10. A side of the positioning plate 12 is provided with positioning columns 122. An end of the battery facing the positioning plate can also be provided with positioning holes (not shown in the figure), the positioning holes are corresponding to the positioning columns 122. When the battery is connected with the connector 121, the positioning column 122 can be accommodated in the positioning hole for positioning the battery. In other embodiments, a sensor (not shown) can also be set on the positioning column 122 to detect whether the battery is in place and correctly installed or otherwise. The positioning column 122 can also be made of elastic material. During the installation and movement of the battery, the positioning column 122 can be used to buffer the battery and absorb the impact force of the battery on the positioning plate 12.

The supporting assembly 10 further comprises a guiding structure 14. The guiding structure 14 is positioned at two opposite sides of the carrier plate 11 along the second direction B. The guiding structure 14 is used to support and guide the moving of the battery and render the battery easier to move and manipulate. Specifically, the guiding structure 14 includes a plurality of rollers 141, the opposite sides of the mounting base 13 are provided with receiving grooves 131, the rollers 141 are rotatably installed in the receiving grooves 131, and a plurality of rollers 141 are arranged in parallel along the first direction A. When the battery moves along the carrier plate 11, the plurality of rollers 141 hold the battery and rotate with the movement of the battery. The rollers 141 can reduce the movement resistance of the battery, and also assist in guiding the movement direction of the battery.

Figure 2:
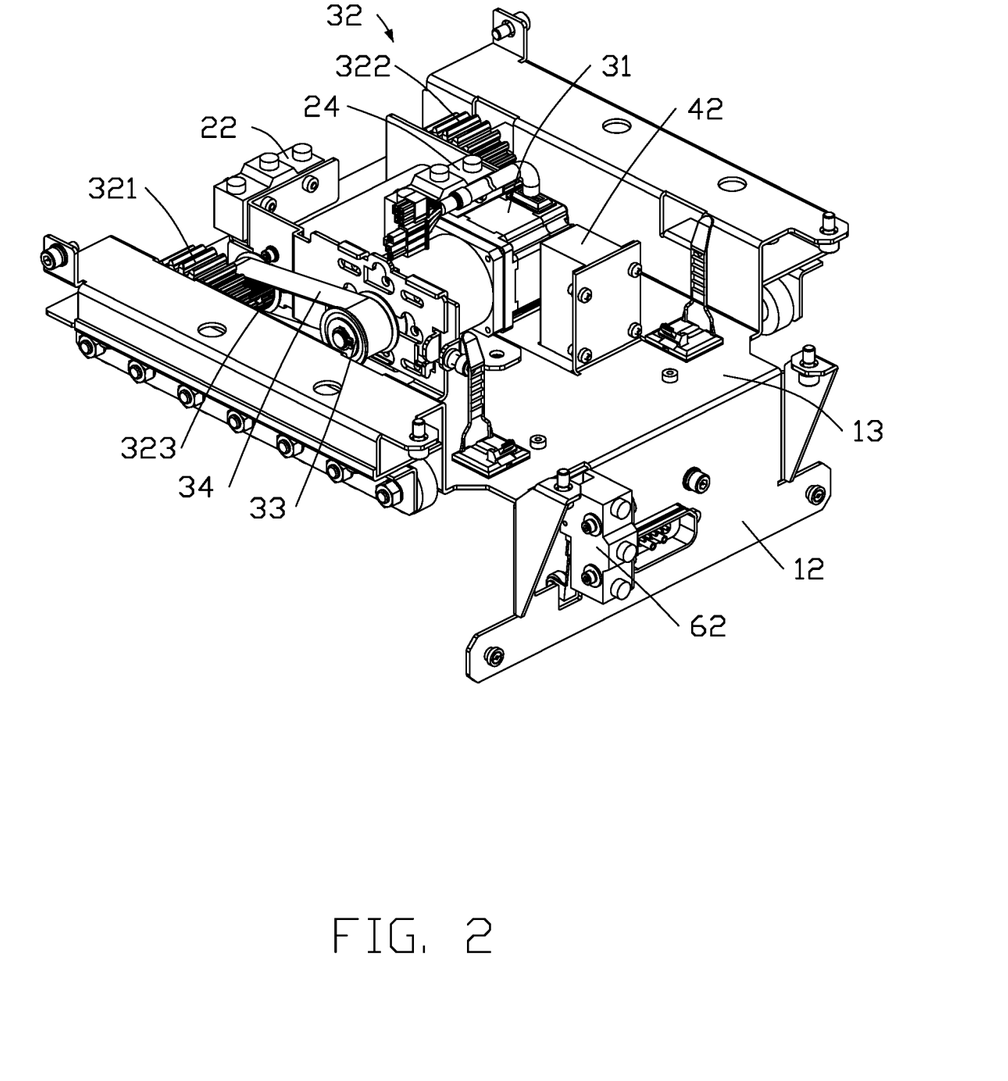
FIG. 2 is a bottom view of the battery replacement device of FIG. 1.

Referring to FIG. 1 and FIG. 2, the detection assembly 20 is positioned at the side of the carrier plate 11 away from the positioning plate 12. In other words, the detection assembly 20 is positioned at the inlet side of the carrier assembly 10. The detection assembly 20 is electrically connected with the driving assembly 30 to detect a position of the battery. Therefore, the battery can be detected in time when it is at the inlet position of the supporting assembly 10, and the driving assembly 30 drives the battery to move towards the positioning plate 12 according to the detected signal.

Specifically, the detection assembly 20 includes a first rotating member 21 and a first detector 22. The end of the carrier plate 11 away from the positioning plate 12 is provided with a first through hole 112, and the first rotating member 21 is arranged in the first through hole 112. A part of the first rotating member 21 is extended out of the first through hole. The first detector 22 is connected with the first rotating member 21 and is arranged on the side of the mounting base 13 away from the carrier plate 11. When the battery is placed at the inlet side of the supporting assembly 10, the first rotating member 21 abuts against the battery, and the first detector 22 can detect the position of the battery through the rotation or the pressure of the first rotating member 21, and the first detector 22 sends out a detection signal.

Furthermore, the detection assembly 20 may also include a second rotating member 23 and a second detector 24. The carrier plate 11 is also provided with a second through hole 113. The second rotating member 23 is arranged in the second through hole 113. A part of the second rotating member 23 is extended out of the second through hole 113. The second detector 24 is connected with the second rotating member 23 and positioned on the side of the mounting base 13 away from the carrier plate 11. Along the first direction A, the second through hole 113 is spaced from the first through hole 112, that is, the second through hole 113 is located between the positioning plate 12 and the first through hole 112. Therefore, the second rotating member 23 and the first rotating member 21 are spaced. The second rotating member 23 and the second detector 24 can be configured to detect the position of the battery on the carrier plate 11 and obtain detection of the movement of the battery from multiple points. The first rotating member 21 and the second rotating member 23 can also be arranged at two opposite sides of the projection 111 to comprehensively detect the position of the battery, reduce problems such as inclination and deflection in the installation process of the battery, and reduce the risk of jamming in the moving process of the battery.

The first rotating member 21 and the second rotating member 23 are roller structures of a type, which can also assist the movement of the battery on the carrier plate 11 and reduce the friction between the battery and the carrier plate 11.

Referring to FIG. 1 and FIG. 2, the drive assembly 30 includes a driver 31 and a gear assembly 32. The driver 31 connects the gear assembly 32, and electrically connects to the detection assembly 20. A rack structure (not shown in the figures) is arranged on a surface of the battery to match with the gear assembly 32. Part of the gear assembly 32 protrudes from the upper surface of the carrier plate. The driver 31 drives the gear assembly 32 to rotate according to the signal of the detection assembly 20, the gear assembly 32 is used to drive the battery to move.

Specifically, the gear assembly 32 includes a first gear 321, a second gear 322, and a transmission shaft 323. The first gear 321 and the second gear 322 are connected to ends of the transmission shaft 323. The drive assembly 30 also includes an output shaft 33 and a drive belt 34. The output shaft 33 is connected with the driver 31, and the drive belt 34 is connected with the output shaft 33 and the drive shaft 323. The driver 31 rotates the transmission shaft 323 through the output shaft 33 and the drive belt 34, so that the first gear 321 and the second gear 322 rotate synchronously. The driver 31 can be a motor and is arranged on the side of the mounting base 13 away from the carrier plate 11. The driver 31 can be started according to the detection signal of the first detector 22. The mounting base 13 is provided with a first through groove 132 and a second through groove 133. Along the second direction B, the first through groove 132 and the second through groove 133 are located on opposite sides of the carrier plate 11. The first gear 321 and the second gear 322 are respectively arranged in the first through groove 132 and the second through groove 133, and the first gear 321 and the second gear 322 partially protrude from the upper surface of the carrier plate 11 to match with the rack structure of the battery, and drive the battery to move.

The locking assembly 40 includes a locking member 41 and a positioning controller 42. A third through hole 114 is defined on the carrier plate 11. The locking member 41 is retractably positioned in the third through hole 114. The positioning controller 42 is connected with the locking member 41, and the positioning controller 42 is configured to detect or control the lifting of the locking member 41. Along the first direction A, the third through hole 114 is located between the second through hole 113 and the positioning plate 12, and the detection assembly 20 is spaced from the locking member 41. The side of the battery facing the carrier plate 11 can also be provided with a positioning slot (not shown in the figure) corresponding to the locking member 41. The positioning controller 42 is electrically connected to the driver 31. When the locking member 41 is housed in the positioning slot of the battery, the battery is connected with the connector 121, and the positioning controller 42 sends a signal to indicate that the battery reaches a predetermined position. The driver 31 stops driving the gear assembly 32 according to the signal of the positioning controller 42.

Furthermore, a side of the locking member 41 away from the positioning plate 12 is provided with an inclined surface 411, the inclination being towards the positioning plate 12. A side of the locking member 41 facing the positioning plate 12 is provided with an abutting surface 412. An angle is formed between the inclined surface 411 and the abutting surface 412. Preferably, the angle between the abutting surface 412 and the inclined surface 411 is an acute angle. When the battery moves towards the positioning plate 12, the inclined surface 411 cancels some resistance of the locking member 41 to the battery and helps the locking member 41 slide into the positioning slot of the battery. After the battery is installed in place, the abutting surface 412 can abut against a side wall of the positioning slot to lock the battery and reduce accidental falls of the battery.

In the battery replacement device 100 of the present disclosure, the gear assembly 32 can rotate and stop in time according to the signals of the detection assembly 20 and the locking assembly 40, driving the battery to move into position on the supporting assembly 10, so that when personnel or other automatic device place the battery at the battery inlet of the machine, the battery replacement device 100 can send the battery to a preset position and connect it with the connector 121, the battery replacement and installation process thus being completed automatically, work efficiency is improved, and labor intensity of staff is reduced.

Referring to FIG. 1, FIG. 2 and FIG. 3, in an embodiment of the present disclosure, the battery replacement device 100 also includes a control unit 50. The control unit 50 is electrically connected with the detection assembly 20, the drive assembly 30, and the locking assembly 40. The detectors of the detection assembly 20, the driver 31 of the drive assembly 30 and the positioning controller 42 of the locking assembly 40 are electrically connected through the control unit 50. When the detection assembly 20 detects that the battery reaches the inlet side of the supporting assembly 10, the detection assembly 20 sends a corresponding signal to the control unit 50. The control unit 50 starts the driver 31 according to the received signal, so as to drive the gear assembly 32 to move the battery towards the positioning plate 12. When the lock 41 is received in the positioning slot of the battery, the positioning controller 42 determines that the battery has reached the preset position and sends a signal to the control unit 50. The control unit 50 stops the driver 31 according to the received signal, so as to stop the movement of the battery and complete the installation and correct positioning of the battery.

The battery replacement device 100 also includes a push assembly 60. The push assembly 60 is electrically connected with the control unit 50 to push the spent battery (the discharged battery) out of the supporting assembly 10. The push assembly 60 is arranged on the positioning plate 12 and includes a push member 61 and a push driver 62. An end of the push member 61 is rotatably connected with the push driver 62, and the push driver 62 is electrically connected with the control unit 50. When the battery is connected with the connector 121, the pushing member 61 is positioned vertically and abuts the battery. When the power of the battery drops below a certain level, the control unit 50 sends a signal to the push driver 62, the push driver 62 drives the push 61 to rotate towards the battery, to push the battery away from the positioning plate 12. At the same time, the driver 31 can also drive the gear assembly 32 to rotate in the opposite direction under the control of the control unit 50 to automatically remove the battery. When the detection assembly 20 ceases detecting the battery, the drive assembly 30 stops.

Figure 4:
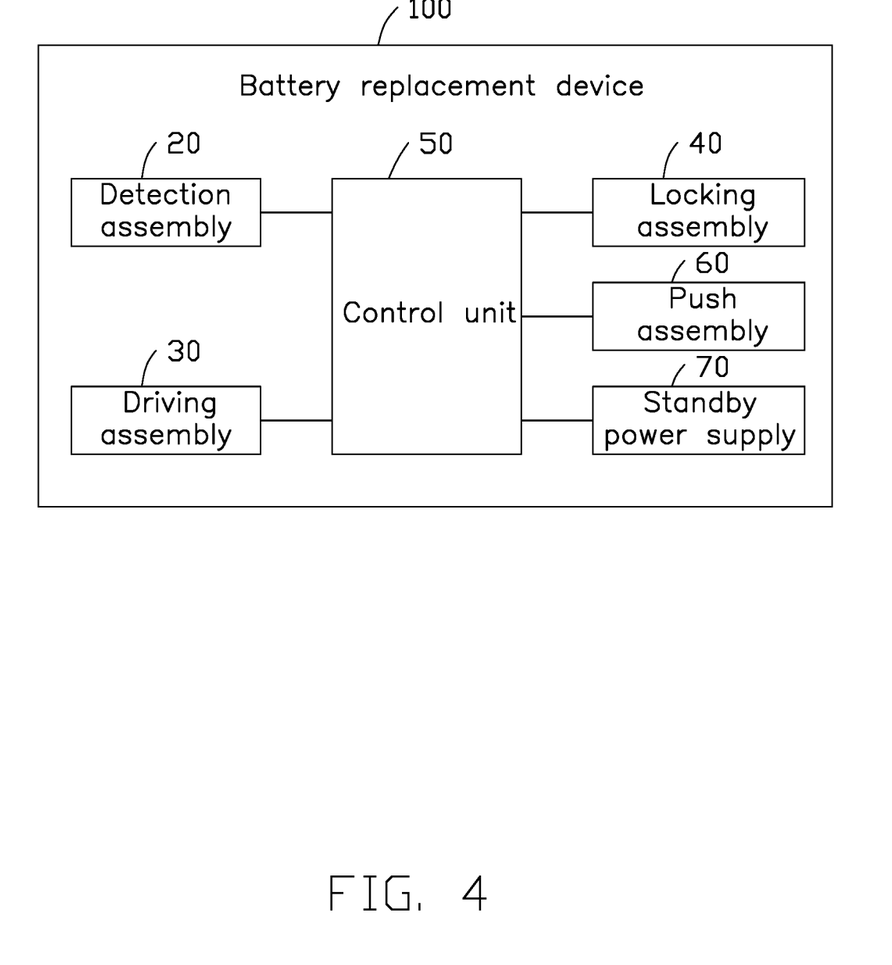
FIG. 4 is a diagram of the battery replacement device of another embodiment according to the present disclosure.

Referring to FIG. 4, the battery replacement device 100 also includes a standby power supply 70, which is electrically connected to the control unit 50. When a battery is spent, the control unit 50 switches the standby power supply 70 to the circuit of the battery replacement device 100, so that the standby power supply 70 is electrically connected to the circuit of the battery replacement device 100 for recharging the spent battery. When a fully charged battery is installed to the carrier assembly 10 and connected to the connector 121, the control unit 50 cuts off the connection between the standby power supply 70 and the circuit, and reconnects the battery to the circuit of the device.

Referring to FIG. 1 to FIG. 4, the present disclosure also discloses a battery replacement method applied to the battery replacement device 100 described in the above embodiment. The battery replacement method includes:
  Step 1: the detection assembly detects a battery reaching the inlet side of the supporting assembly and sends a signal to the control unit;
  Step 2: the control unit starts the driver according to the signal of the detection assembly, the driver drives the gear component to rotate, to move the battery along the carrier plate of the supporting assembly;
  Step 3: the locking member locks the battery, and the positioning controller determines that the battery has moved to a predetermined position and sends out a signal;
  Step 4: the control unit stops the driver according to the signal sent by the positioning controller.

Figure 5:
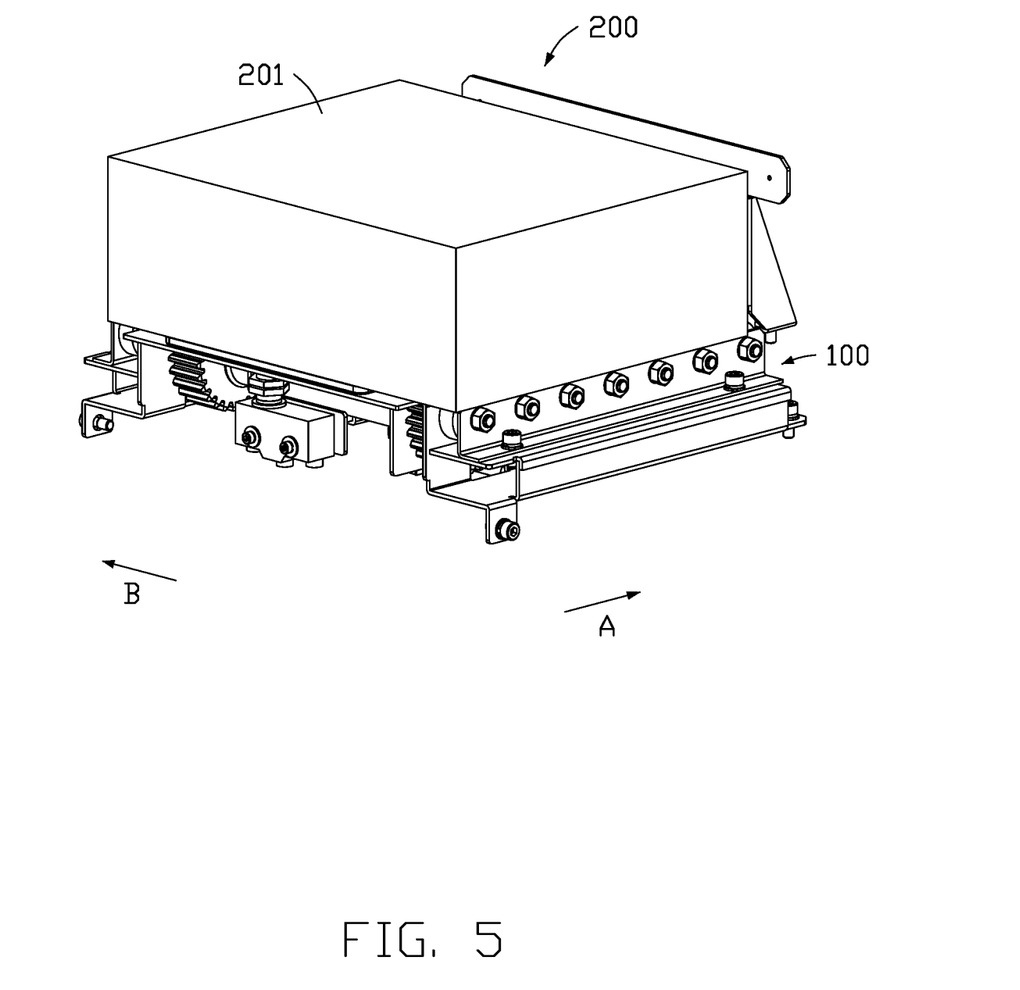
FIG. 5 is a schematic view of a power supply device of another embodiment according to the present disclosure.

Referring to FIG. 5, the embodiment of the present application also provides a power supply device 200, including a battery 201 and the battery replacement device 100 described in the above embodiment. The battery 201 is detachably arranged on the supporting assembly 10 of the battery replacement device 100.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A battery replacement device comprising:
  a supporting assembly comprising a carrier plate; a positioning plate; and a connector, wherein the positioning plate is arranged at a side of the carrier plate, the connector is positioned on the positioning plate;
  a detection assembly positioned at a side of the carrier plate away from the positioning plate;
  a drive assembly comprising a driver and a gear assembly, wherein the driver is connected to the gear assembly, and the detection assembly is electrically connected to the driver, a part of the gear assembly is protruded from the carrier plate, the driver drives the gear assembly to rotate according to signals from the detection assembly; and a locking assembly comprising a locking member; and a positioning controller, wherein the locking member is retractably arranged on the carrier plate, the locking member is connected to the positioning controller, the detection assembly is spaced from the locking member, the driver is electrically connected to the positioning controller, and the driver stops driving the gear assembly according to signals from the positioning controller.

2. The battery replacement device of claim 1, wherein the supporting assembly comprises a mounting base and a guiding structure, the carrier plate is detachably arranged on the mounting base, the guiding structure is positioned at two opposite sides of the mounting base; and wherein the guiding structure comprises a plurality of rollers, receiving grooves are defined at the two opposite sides of the mounting base, the plurality of rollers are rotatably arranged in the receiving grooves.

3. The battery replacement device of claim 1, wherein the detection assembly comprises a first rotating member and a first detection, the first rotating member is connected to the first detection; and a first through hole is defined on the carrier plate, the first rotating member is positioned in the first through hole, and a part of the first rotating member is extended out of the first through hole.

4. The battery replacement device of claim 3, wherein the detection assembly further comprises a second rotating member and a second detection, the second rotating member is connected to the second detection; and a second through hole is defined on the carrier plate, and the second through hole is located between the first through hole and the positioning plate, the second rotating member is positioned in the second through hole, and a part of the second rotating member is extended out of the second through hole.

5. The battery replacement device of claim 4, wherein a third through hole is defined on the carrier plate, and the third through hole is located between the second through hole and the positioning plate;

the locking member is retractably arranged in the third hole; and a decline surface is defined at a side of the locking member away from the positioning plate, an abutting surface is defined at a side of the locking member facing the positioning plate, and an acute angle is formed between the decline surface and the abutting surface.

6. The battery replacement device of claim 1, wherein the gear assembly comprises a first gear, a second gear, and a transmission shaft, the first gear and the second gear are respectively connected to two ends of the transmission shaft;

the first gear and the second gear are respectively located at two sides of the carrier plate, and the first gear and the second gear are partially protruded from the upper surface of the carrier plate; and the drive assembly further comprises an output shaft and a drive belt, the drive belt is sleeved on the transmission shaft and the output shaft.

7. The battery replacement device of claim 1, wherein the battery replacement device further comprises a control unit, the control unit is electrically connected to the detection assembly, the driver, and the positioning controller.

8. The battery replacement device of claim 7, wherein the battery replacement device further comprises a push assembly, the control unit is electrically connected to the push assembly; and the push assembly comprises a push member and a push driver, an end of the push member is connected to the push driver, the push driver moves the push member according to signals from the control unit.

9. A battery replacement method applicable in the battery replacement device of claim 1, the battery replacement method comprising:

the detection assembly detects a battery reaches an inlet side of the supporting assembly and sends a signal to the driver;

the driver drives the gear assembly to rotate according to the signal of the detection assembly, the gear assembly moves the battery along the carrier plate;

the locking member locks the battery, and the positioning controller determine that the battery moves to a predetermined position and sends a signal to the driver;

the driver stops the gear assembly according to the signal sent by the positioning controller.

10. A power supply device comprising:

a battery; and a battery replacement device comprising:

a supporting assembly comprising a carrier plate; a positioning plate; and a connector, wherein the positioning plate is arranged at a side of the carrier plate, the connector is positioned on the positioning plate and connected to the battery;

a detection assembly positioned at a side of the carrier plate away from the positioning plate;

a drive assembly comprising a driver and a gear assembly, wherein the driver is connected to the gear assembly, and the detection assembly is electrically connected to the driver, a part of the gear assembly is protruded from the carrier plate, the driver drives the gear assembly to rotate according to signals from the detection assembly, the gear assembly moves the battery on the carrier plate; and a locking assembly comprising a locking member and a positioning controller, wherein the locking member is retractably arranged on the carrier plate, the locking member is connected to the positioning controller, the detection assembly is spaced from the locking member, the driver is electrically connected to the positioning controller, and the driver stops rotation of the gear assembly according to signals from the positioning controller.

11. The power supply device of claim 10, wherein the supporting assembly comprises a mounting base and a guiding structure, the carrier plate is detachably arranged on the mounting base, the guiding structure is positioned at two opposite sides of the mounting base; and wherein the guiding structure comprises a plurality of rollers, receiving grooves are defined at the two opposite sides of the mounting base, the plurality of rollers are rotatably arranged in the receiving groove.

12. The power supply device of claim 10, wherein the detection assembly comprises a first rotating member and a first detection, the first rotating member is connected to the first detection; and a first through hole is defined on the carrier plate, the first rotating member is positioned in the first through hole, and the first rotating member is partially protruded from an upper surface of the carrier plate.

13. The power supply device of claim 12, wherein the detection assembly further comprises a second rotating member and a second detection, the second rotating member is connected to the second detection; and a second through hole is defined on the carrier plate, and the second through hole is located between the first through hole and the positioning plate, the second rotating member is positioned in the second through hole, and the second rotating member is partially protruded from the upper surface of the carrier plate.

14. The power supply device of claim 13, wherein a third through hole is defined on the carrier plate, and the third through hole is located between the second through hole and the positioning plate;

the locking member is retractably arranged in the third hole; and a decline surface is defined at a side of the locking member away from the positioning plate, an abutting surface is defined at a side of the locking member facing the positioning plate, and an acute angle is formed between the decline surface and the abutting surface.

15. The power supply device of claim 10, wherein the gear assembly comprises a first gear, a second gear, and a transmission shaft, the first gear and the second gear are respectively connected to two ends of the transmission shaft;

the first gear and the second gear are respectively located at two sides of the carrier plate, and the first gear and the second gear are partially protruded from the upper surface of the carrier plate; and the drive assembly further comprises an output shaft and a drive belt, the drive belt is sleeved on the transmission shaft and the output shaft.

16. The power supply device of claim 10, wherein the battery replacement device further comprises a control unit, the control unit is electrically connected to the detection assembly, the driver, and the positioning controller.

17. The battery replacement device of claim 16, wherein the battery replacement device further comprises a push assembly, the control unit is electrically connected to the push assembly; and the push assembly comprises a push member and a push driver, an end of the push member is connected to the push driver, the push driver moves the push member according to signals from the control unit.

* * * * *